United States Patent
Morroney et al.

(10) Patent No.: US 8,025,318 B1
(45) Date of Patent: Sep. 27, 2011

(54) PUSH TO CONNECT FITTING WITH FORMED GRIPPER TEETH

(75) Inventors: Wayne D. Morroney, Fremont, OH (US); Darwin C. Olson, Perrysburg, OH (US)

(73) Assignee: Alkon Corporation, Fremont, OH (US)

( * ) Notice: Subject to any disclaimer, the term of this patent is extended or adjusted under 35 U.S.C. 154(b) by 92 days.

(21) Appl. No.: 12/430,433

(22) Filed: Apr. 27, 2009

Related U.S. Application Data

(60) Provisional application No. 61/054,531, filed on May 20, 2008.

(51) Int. Cl.
F16L 21/06 (2006.01)

(52) U.S. Cl. ....................................................... 285/322

(58) Field of Classification Search .................. 285/322, 285/324, 391, 305
See application file for complete search history.

(56) References Cited

U.S. PATENT DOCUMENTS

| | | | |
|---|---|---|---|
| 1,297,719 A * | 3/1919 | Myers ............................ | 285/322 |
| 2,458,874 A * | 1/1949 | Parker ............................ | 285/34 |
| 2,705,652 A * | 4/1955 | Kaiser ............................ | 285/322 |
| 3,233,924 A * | 2/1966 | Stanley et al. ................. | 285/322 |
| 3,394,950 A * | 7/1968 | Jensen ............................ | 285/322 |
| 3,815,940 A | 6/1974 | Luckenbill | |
| 3,951,441 A | 4/1976 | Scheuer et al. | |
| 4,045,055 A * | 8/1977 | Blakely .......................... | 285/322 |
| 4,293,149 A * | 10/1981 | Bonel ............................. | 285/322 |
| 4,304,426 A * | 12/1981 | Francis .......................... | 285/323 |
| 4,363,337 A | 12/1982 | Pease | |
| 4,538,339 A | 9/1985 | Ewing | |
| 4,666,192 A * | 5/1987 | Zamora .......................... | 285/322 |
| 4,905,766 A | 3/1990 | Dietz et al. | |
| 5,042,844 A * | 8/1991 | Iida et al. ....................... | 285/391 |
| 5,109,929 A | 5/1992 | Spears | |
| 5,580,099 A * | 12/1996 | Eaton ............................. | 285/322 |
| 5,649,723 A * | 7/1997 | Larsson ......................... | 285/322 |
| 5,683,120 A | 11/1997 | Brock et al. | |
| 5,909,902 A * | 6/1999 | Seabra ........................... | 285/322 |

* cited by examiner

*Primary Examiner* — David E Bochna
(74) *Attorney, Agent, or Firm* — Young Basile Hanlon & MacFarlane, P.C.

(57) ABSTRACT

A push to connect fitting which includes a body portion and a tubular collet at least partially disposed within the body portion, wherein a section of tubing is receivable within the collet. A thread is formed on an inner periphery of the collet, wherein each turn of the thread provides two points of engagement along the longitudinal dimension of the section of tubing.

17 Claims, 4 Drawing Sheets though the PTC fittings shown are different from each other in that fitting 1a has a machined tooth 8 on the inner periphery thereof and fitting 1b has tapped threads 9 that define a plurality of teeth on the inner periphery of the collet 4.

PUSH TO CONNECT FITTING WITH FORMED GRIPPER TEETH

CROSS-REFERENCE TO RELATED APPLICATIONS

This application claims the benefit of U.S. Provisional Patent Application Ser. No. 61/054,531, filed on May 20, 2008.

FIELD OF THE INVENTION

The invention relates to the field of quick-connect fittings that are connectable to a section of tubing or pipe, and more particularly, a quick-connect fitting that utilizes a push to connect fitting having formed gripper teeth to connect a section of tubing or pipe.

BACKGROUND

Push to connect (PTC) or push-in type fittings are used to connect a section of either plastic or metal tubing in a variety of fluid conveyance applications, such as in hydraulic or pneumatic systems. For example, in automotive applications, PTC fittings are used to connect sections of tubing in various systems of the automobile, such as in the cooling, braking, and fuel systems.

Conventional PTC fittings include a body portion having a bore therethrough and a tubular collet that is partially disposed within the bore of the body portion. An engaging structure, or gripper, is formed on the inner periphery of the collet. When the tubing is inserted into the collet, the gripper engages the tubing to prevent withdrawal of the tubing from the collet, and the tubing widens the portion of the collet that is disposed within the bore of the body portion, preventing removal of the collet from the body portion. To prevent leaking, an o-ring is provided within the bore of the body portion, inward of the collet, for engagement with the exterior surface of the tubing.

It is known to use grippers having a substantially triangular machined tooth. However, these types of grippers present a number of challenges. For instance, it is difficult to machine such a tooth accurately and consistently. Generally, a recess tool is used to machine the tooth, making the process time lengthy and expensive. Furthermore, since the tooth must be very sharp to retain the tubing within the fitting, there is a chance that the tubing can be scratched during insertion, preventing the o-ring from properly sealing with respect to the tubing.

Another known gripper uses tapped threads instead of a machined tooth. Since each turn of the thread effectively provides an additional engaging element along the longitudinal dimension of the tubing, the grip is increased, and thus, the threads need not be as sharp as the machined teeth. However, the required tolerances of such threads are tight. Thus, the threads are difficult to form accurately, and expensive tooling is required to form the tapped threads correctly. Furthermore, the tapping process may leave debris within the assembled fitting, which can prevent the o-ring from properly sealing with respect to the tubing.

SUMMARY

A push to connect fitting with formed gripper teeth includes a body portion and a tubular collet that is at least partially disposed within the body portion of the push to connect fitting, wherein a section of tubing is receivable within the collet. A thread is formed on an inner periphery of the collet. The thread has a double-crested profile, such that each turn of the thread provides two points of engagement with the section of tubing with respect to the longitudinal dimension of the second section of tubing.

The push to connect fitting may have a double crested profile that is provided by a pair of crests that are longitudinally spaced by a central concavity. The central concavity may be substantially arcuate. Successive turns of the thread may be separated by a substantially arcuate thread bottom. Furthermore, the thread bottom may be wider and deeper than the central concavity.

The push to connect fitting may be configured such that engagement of the thread with the section of tubing resists removal of the section of tubing from the collet by causing engagement of the collet with the body portion, thereby tightening the collet with respect to the section of tubing. Furthermore, the thread may be a roll-formed thread.

A method for forming a gripper for a push to connect fitting according to the invention comprises the steps of providing a tubular member having an interior diameter, selecting a roll-forming tap adapted to form a roll-formed thread within a tubular workpiece having a diameter that is smaller than the interior diameter of the tubular member, and engaging the selected roll-forming tap with an inner bore of the tubular member. Engagement of the selected roll-forming tap with the tubular member produces an incompletely formed roll-formed thread having a double-crested profile.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
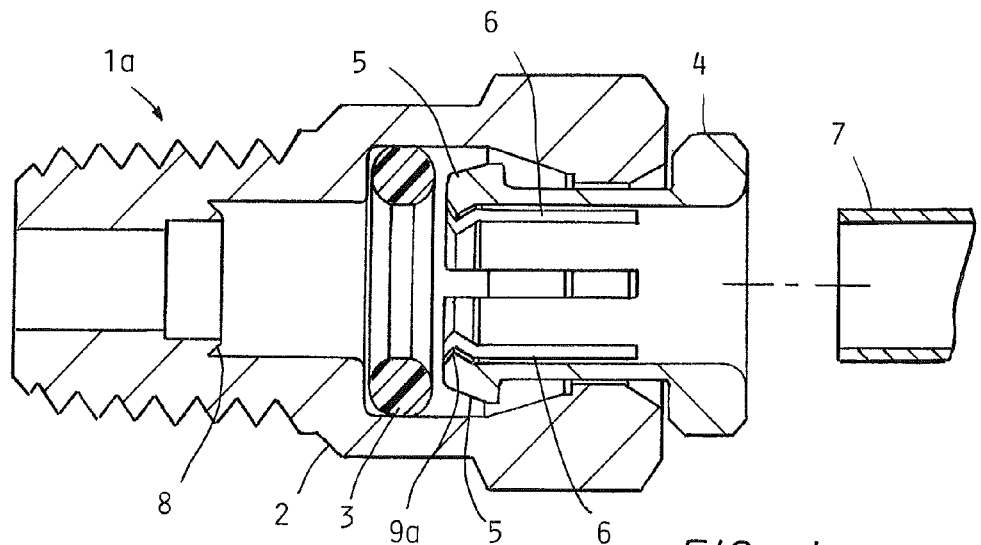
FIG. 1 is a cross-section showing a prior art PTC fitting having a machined gripper tooth.
Figure 2:
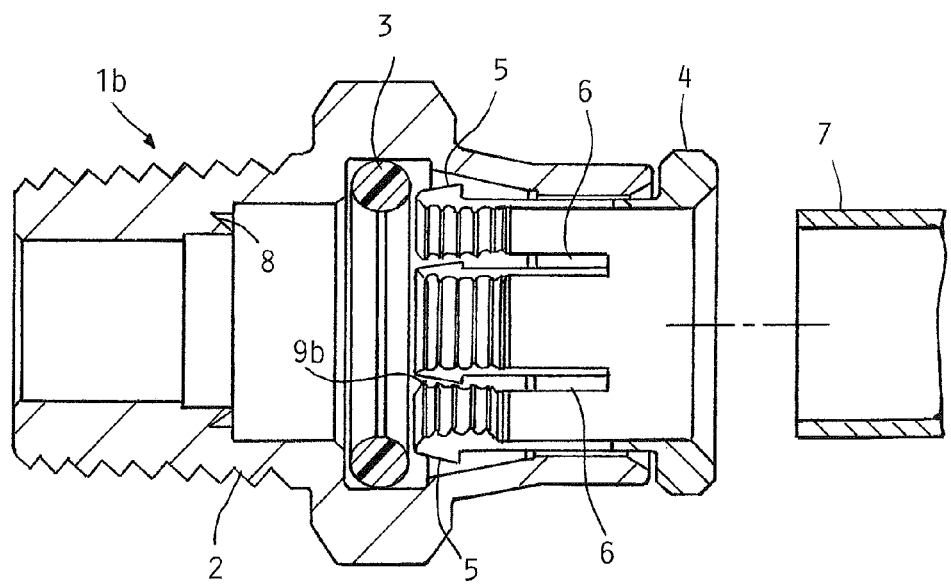
FIG. 2 is a cross-section view showing a prior art PTC fitting having gripper teeth fabricated from a tapped thread.

FIGS. 1-2 show a first conventional push to connect (PTC) fitting 1a and a second conventional PTC fitting 1b, respectively, as are well known in the art. Both fittings 1a, 1b include a body portion 2, an o-ring 3 disposed within the body portion 2, and a collet 4 partially disposed within the body portion 2. Both fittings 1a, 1b have a plurality of longitudinally extending fingers 5 that are separated from one another by longitudinal slots 6 that extend through an inner end of each collet 4. The fittings 1a, 1b are connectable to a tube 7 by passing the tube 7 into the collet 4 and through the o-ring 3 to create a seal between the body portion 2 and the tube 7. The tube 7 further extends into the body portion 2 until the tube 7 reaches a shoulder 8 that prevents further insertion of the tube 7 into the body portion 2 of the fittings 1a, 1b. The tube 7 can be released from the fitting 1a, 1b by pushing the collet 4 toward the body portion 2 while pulling the tube 7 out of the collet 4.

To engage and resist withdrawal of the tube 7 from the collet 4, the PTC fitting 1a, shown in FIG. 1, has a machined gripper tooth 9a on the inner periphery of each finger 5 of the collet 4. The machined gripper teeth 9a are formed by machining the collet 4 using a recess tool (not shown) to form a single, substantially triangular, annular ridge before the slots 6 are cut into the collet 4.

Instead of the machined gripper teeth 9a, the PTC fitting 1b, shown in FIG. 2, includes a plurality of tapped gripper teeth 9b on the interior periphery of each finger 5 of the collet 4. The tapped gripper teeth 9b engage the tube 7 and resist withdrawal of the tube 7 from the collet 4. The tapped gripper teeth 9b are formed by tapping, i.e. cutting a screw thread into the inner periphery of the collet 4. The screw thread provides one tapped gripper tooth 9b per turn of the thread. The slots 6 are cut into the collet 4 after the tapped gripper teeth 9b are cut into the collet 4.

Figure 3:
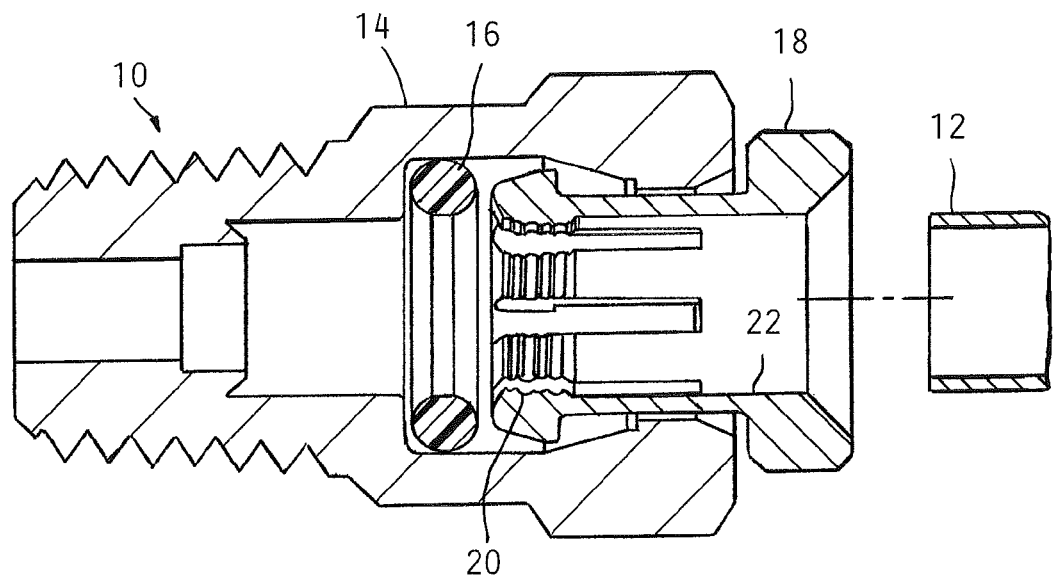
FIG. 3 is a cross-section view showing a PTC fitting having gripper teeth fabricated from a roll-formed thread according to the present invention.

FIG. 3 shows a PTC fitting 10 according to the present invention for connecting a section of a tube 12 to a workpiece (not shown), wherein the workpiece may comprise another section of tube, another fitting, an elbow, a pneumatic or hydraulic component, etc. The fitting 10 includes a body portion 14, an o-ring 16, and a collet 18. A plurality of roll-formed gripper teeth 20 are provided on an inner periphery 22 of the collet 18, as will be explained in detail herein.

Figure 4:
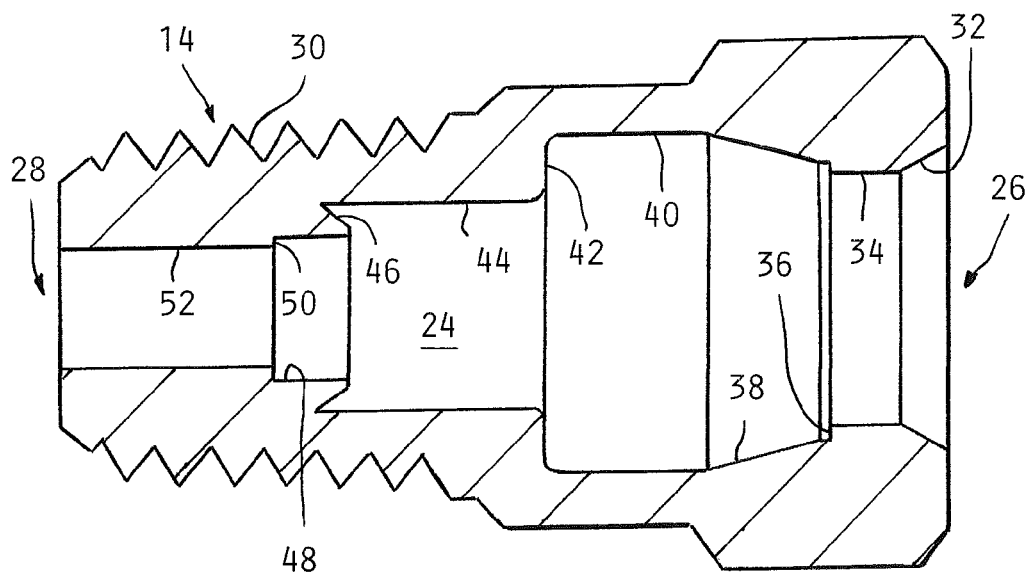
FIG. 4 is a cross-section view showing a body portion of the PTC fitting of FIG. 3 of the present invention.

The body portion 14 of the PTC fitting 10 has a tube-like structure having a stepped bore 24 extending therethrough between a first open end 26 and a second open end 28, as shown in FIG. 4. The collet 18 and the tube 12 are receivable within the first open end 26 of the body portion 14, while a threaded portion 30 is formed on the exterior of the body portion 14 at the second open end 28 for providing a threaded connection to the workpiece. However, it should be understood that the threaded portion 30 of the body portion 14 is included for explanatory purposes only, as the fitting 10 need not include the threaded portion 30. Instead, the fitting 10 could be, for example, incorporated into a hydraulic or pneumatic component or be provided as a longitudinally symmetrical union coupler.

The profile of the stepped bore 24 of the body portion 14 will now be discussed by progressing from the first open end 26 of the body portion 14 to the second open end 28 of the body portion 14. At the first open end 26 of the body portion 14, a tapered surface 32 is provided to compress the collet 18 when the collet 18 enters the stepped bore 24. Inward of the tapered surface 32, a first constant-diameter section 34 is provided before the diameter of the stepped bore 24 increases substantially radially at a first shoulder 36. The first shoulder 36 faces toward the second open end 28 of the body portion 14. Inward of the first radially-extending shoulder 36, a ramped or tapered surface 38 is provided on the stepped bore 24 to compress the collet 18 in response to an attempt to move the collet 18 out of the stepped bore 24. The ramped surface 38 increases the stepped bore 24 in diameter in a direction of travel from the first open end 26 to the second open end 28. Further toward the second open end 28 of the body portion 14 from the ramped surface 38, a second constant-diameter section 40 leads to a second shoulder 42 that extends radially and faces toward the first open end 26 of the body portion 14. The second shoulder 42 provides a surface upon which the o-ring 16 is seated to resist movement of the o-ring 16 while the tube 12 is inserted through the o-ring 16. A third constant-diameter section 44 extends from the second shoulder 42 and has a diameter similar to that of the tube 12. The third constant-diameter section 44 leads a third shoulder 46, which faces the first open end 26 of the body portion 14 and reduces the diameter of the stepped bore 24 to limit the maximum insertion of the tube 12.

To allow the use of the fitting 10 with an optional floating tube support, as described in U.S. Pat. No. 5,743,571, which is incorporated herein by reference, a fourth shoulder 50 may be provided between the third shoulder 46 and the second open end 28 of the body portion 14. The fourth shoulder 50 reduces the diameter of the stepped bore 24 from a fourth constant-diameter section 48, which is adjacent to the third shoulder 46, to a fifth constant-diameter section 52, which is adjacent to the second open end 28 of the body portion 14.

Figure 5:
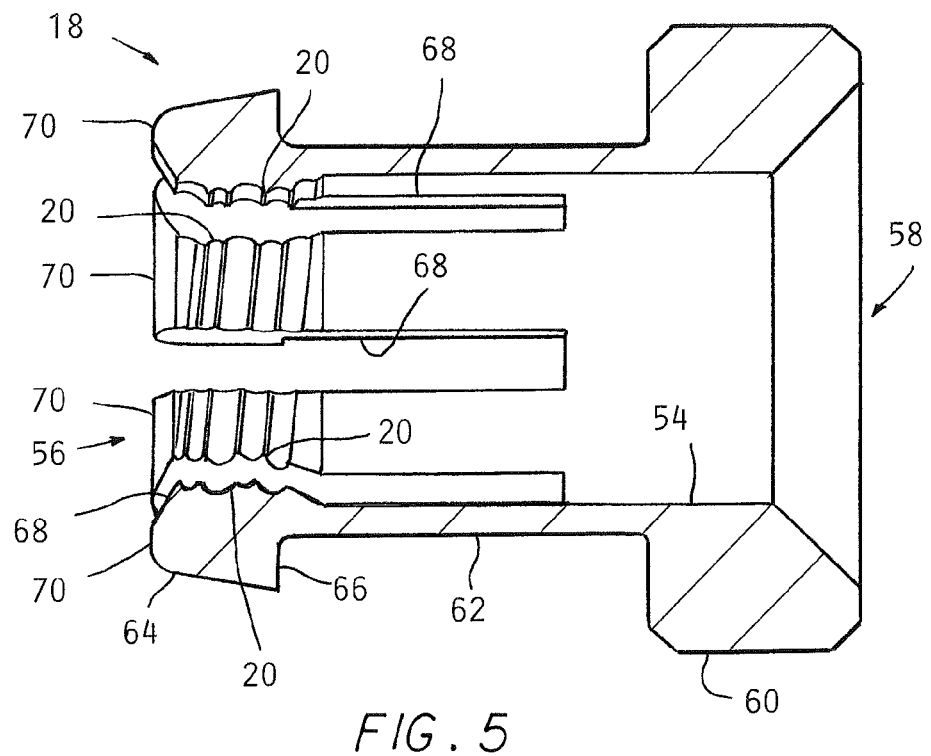
FIG. 5 is a cross-section view showing a collet of the PTC fitting of FIG. 3 of the present invention.

As best seen in FIG. 5, the collet 18 is a substantially tubular member having an inner periphery 54 that extends between an inner end 56 and an outer end 58 of the collet 18. An annular rim 60 is formed on an outer periphery 62 of the collet 18 adjacent to the outer end 58 of the collet 18 to prevent over-insertion of the collet 18 into the stepped bore 24 of the body portion 14 of the fitting 10. Adjacent to the inner end 56 of the collet 18, a taper 64 is formed on the outer periphery 62 of the collet 18 to facilitate compression of the collet 18 as it enters the stepped bore 24 of the body portion 14. Inward of the taper 64, a shoulder 66 faces the outer end 58 of the collet 18 to resist removal of the collet 18 from the body portion 14 by engaging the ramped surface 38 and the first shoulder 36 of the stepped bore 24.

A plurality of longitudinal slots 68 extend from the inner end 56 of the collet 18 toward an intermediate point along the collet 18. The slots 68 cooperate to define a plurality of fingers 70 at the inner end 56 of the collet 18. Due to the length and width of the slots 68, the fingers 70 exhibit sufficient resiliency such that deformation of the fingers 70 in a radially inward direction collapses the inner end 56 of the collet 18 so that the taper 64 and the shoulder 66 of the collet 18, which are normally larger in diameter than the first constant-diameter section 34 of the stepped bore 24 of the body portion 14, may collapse to a diameter that allows that inner end 56 of the collet 18 to pass through the first constant-diameter section 34 of the body portion 14.

Figure 6:
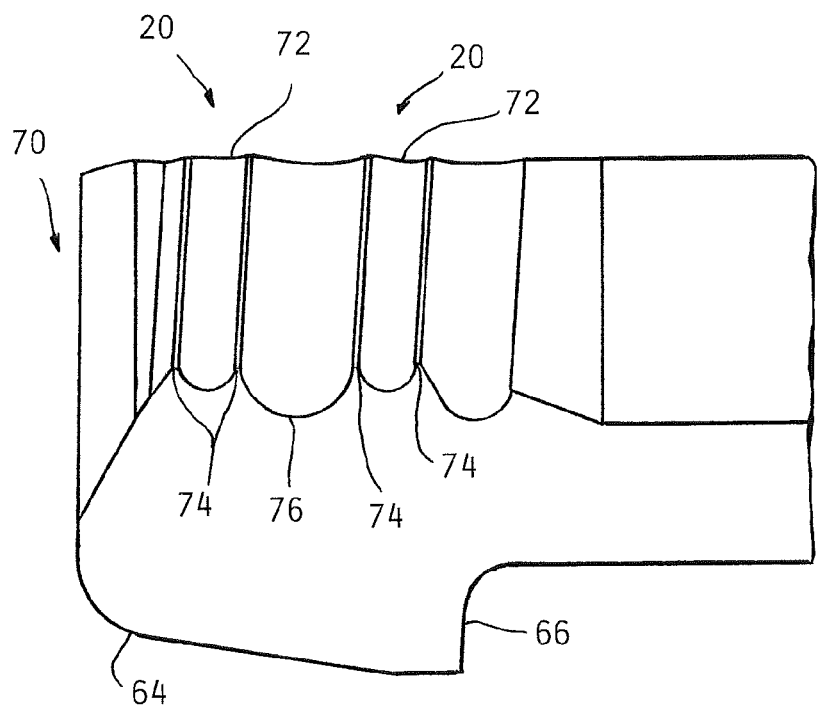
FIG. 6 is a detail view showing a finger portion of the collet of FIG. 5 of the present invention.

To allow the collet 18 to engage the tube 12 and resist withdrawal of the tube 12 from the body portion 14 of the fitting 10, the roll-formed gripper teeth 20 are provided on the inner periphery 54 of the fingers 70 of the collet 18 adjacent the inner end 56 of the collet 18. As best seen in FIG. 6, each roll-formed gripper tooth 20 has a double-crested profile, including a substantially arcuate central concavity 72 that is flanked by a pair of crests 74, which act as two separate, spaced apart engaging structures for engaging the tube 12. Successive roll-formed gripper teeth 20 are separated by a substantially arcuate thread bottom 76 having a depth and width approximately twice that of the central concavity 72. The thread bottom 76 marks the interface between successive turns of a roll-formed thread that is formed in the inner periphery 54 of the collet 18 before the slots 68 are cut in order to fabricate the roll-formed gripper teeth 20. Thus, in the fitting 10, a single turn of the thread provides two of the roll-formed gripper teeth 20, whereas the conventional PTC fitting 116 shown in FIG. 2 provides only one tapped gripper tooth per turn of the thread.

Figure 7:
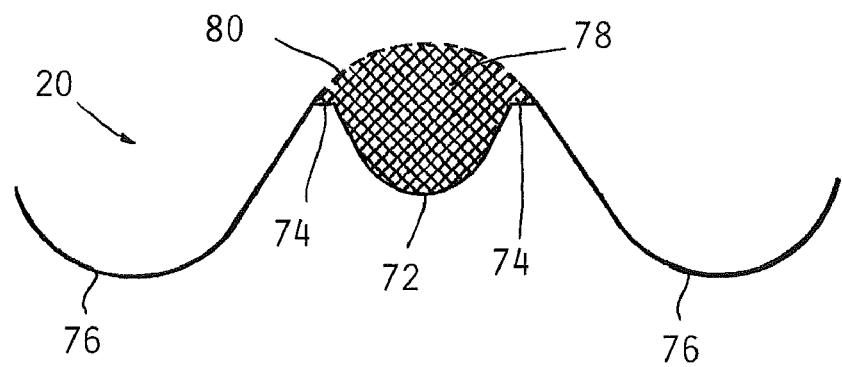
FIG. 7 is an illustration showing an incomplete formation of a roll-formed thread according to the present invention.

The roll forming process does not cut or remove the material from which the collet 18 is fabricated, but rather, the roll forming process displaces and compresses the material to form a generally sinusoidal shape. However, the roll-formed gripper teeth 20 are formed using a roll-forming tap (not shown) that is adapted to form a roll-formed thread in a bore having a diameter that is slightly smaller than the diameter of the inner periphery 54 of the collet 18, which prevents a conventional roll-formed thread from fully forming. If the inner periphery 54 of the collet 18 was appropriately sized for the selected roll-forming tap, a "full" thread having an arcuate thread crest 80 would be formed by cold-working the material of the collet 18 until it filled the shaded region 78, as shown in FIG. 7. However, since the diameter of the inner periphery 54 of the collet 18 is larger than the diameter at which the selected roll-forming tap will produce a full thread, the double crested thread profile of the roll-formed gripper teeth 20 results.

Figure 8:
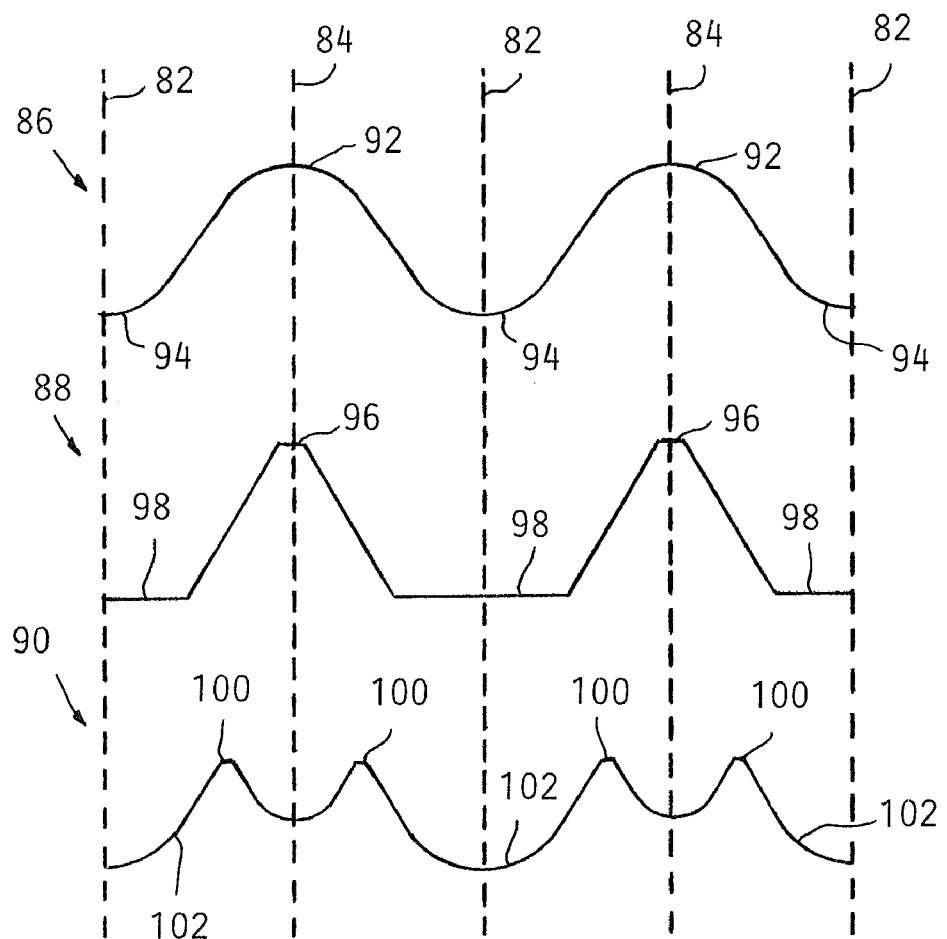
FIG. 8 is an illustration comparing the thread profiles of a roll-formed thread, a tapped thread, and an incompletely formed roll-formed thread according to the present invention across two turns of each thread.

For purposes of comparison, FIG. 8 shows the thread profiles, including the locations of thread interfaces 82 and thread centers 84 for two turns each of a completely formed roll-formed thread 86, a tapped thread 88, and an incompletely formed roll-tapped thread 90. The thread crests 92 and the thread bottoms 94 of the completely formed roll-formed thread 86 are aligned with the thread centers 84 and the thread interfaces 82, respectively, and are substantially arcuate and roughly sinusoidal, and thus, the completely formed roll-tapped thread 90 is not capable of gripping a tube to resist its withdrawal from a PTC fitting. The thread crests 96 and the thread bottoms 98 of the tapped thread 88 are aligned with the thread centers 84 and the thread interfaces 82. The thread crests 96 of the tapped thread 88 have a substantially triangular profile, while the thread bottoms 98 are substantially flat. Since the thread crests 96 of the tapped thread coincide with the thread centers 84, the tapped thread 88, when used in the gripper of a PTC fitting, provides one point of engagement with the tube 12, as measured along the longitudinal dimension of the tube 12, for each turn of the thread. The thread bottoms 102 of the incompletely formed roll-tapped thread 90 are aligned with the thread interfaces 82. However, the incompletely formed roll-tapped thread 90 provides a pair of thread crests 100 between adjacent pairs of thread bottoms 102, one on each side of each thread center 84. Each thread crest 100 provides a separate, substantially triangular, tooth-like structure. Thus, the incompletely formed roll-tapped thread 90, when used in the gripper of a PTC fitting, provides two points of engagement with the tube 12, as measured along the longitudinal dimension of the tube 12, for each turn of the thread. Thus, for an equal number of turns of thread, the incompletely formed roll-tapped thread 90 provides twice the grip of a comparable tapped thread 88.

In use, the tube 12 is inserted into the collet 18 and through the O-ring 16 until it engages the third shoulder 46 of the body portion 14. Withdrawal of the tube 12 from the body portion 14 is resisted by engagement of the roll-formed gripper teeth 20 of the collet 18 with the tube 12.

While the invention has been described in connection with what is presently considered to be the most practical and preferred embodiment, it is to be understood that the invention is not to be limited to the disclosed embodiments, but to the contrary, it is intended to cover various modifications and equivalent arrangements included within the spirit and scope of the appended claims. The scope is to be accorded the broadest interpretation so as to encompass all such modifications and equivalent structures as is performed under the law.

What is claimed is:

1. In a push to connect fitting that is connectable to a section of tubing, the fitting having a body portion and a tubular collet at least partially disposed within the body portion, wherein the section of tubing is receivable within the collet, the improvement comprising:
    a thread formed on an inner periphery of the collet, wherein each turn of the thread provides two points of engagement that are directly adjacent to each other along the longitudinal dimension of the section of tubing.

2. In a push to connect fitting that is connectable to a section of tubing, the fitting having a body portion and a tubular collet at least partially disposed within the body portion, wherein the section of tubing is receivable within the collet, the improvement comprising:
    a thread formed on an inner periphery of the collet, wherein each turn of the thread provides two points of engagement along the longitudinal dimension of the section of tubing, wherein the thread has a double-crested profile.

3. The push to connect fitting of claim 2, wherein the double crested profile of the thread is provided by a pair of crests that are longitudinally spaced by a central concavity.

4. The push to connect fitting of claim 3, wherein the central concavity is substantially arcuate.

5. The push to connect fitting of claim 4, wherein successive turns of the thread are separated by a substantially arcuate thread bottom.

6. The push to connect fitting of claim 5, wherein the thread bottom is wider and deeper than the central concavity.

7. The push to connect fitting of claim 2, wherein the thread is a roll-formed thread.

8. The push to connect fitting of claim 2, wherein engagement of the thread with the section of tubing resists removal of the section of tubing from the collet by causing engagement of the collet with the body portion, thereby tightening the collet with respect to the section of tubing.

9. A push to connect fitting, comprising:
    a section of tubing having a substantially smooth exterior;
    a fitting portion in which the section of tubing is receivable; and
    a thread formed on an inner periphery of the fitting portion, wherein each turn of the thread provides two points of engagement along the longitudinal dimension of the substantially smooth exterior of the section of tubing.

10. A push to connect fitting, comprising:
    a fitting portion in which the section of tubing is receivable; and
    a thread formed on an inner periphery of the fitting portion, wherein each turn of the thread provides two points of engagement along the longitudinal dimension of the section of tubing, wherein the thread has a double-crested profile.

11. The push to connect fitting of claim 10, wherein the double crested profile of the thread is provided by a pair of crests that are longitudinally spaced by a central concavity.

12. The push to connect fitting of claim 11, wherein the central concavity is substantially arcuate.

13. The push to connect fitting of claim 12, wherein successive turns of the thread are separated by a substantially arcuate thread bottom.

14. The push to connect fitting of claim 13, wherein the thread bottom is wider and deeper than the central concavity.

15. The push to connect fitting of claim 14, wherein the thread is a roll-formed thread.

16. The push to connect fitting of claim 15, further comprising:
    a body portion; and
    the fitting portion disposed at least partially within the body portion, wherein engagement of the thread with the section of tubing resists removal of the section of tubing from the fitting portion by causing engagement of the fitting portion with the body portion, thereby tightening the fitting portion with respect to the section of a tubing.

17. In a push to connect fitting that is connectable to a section of tubing, the fitting having a body portion and a tubular collet at least partially disposed within the body portion, the tubular collet having a plurality of fingers, wherein the section of tubing is receivable within the collet, the improvement comprising:

a thread formed on an inner periphery of the collet, wherein each turn of the thread provides two points of engagement along the longitudinal dimension of the section of tubing on each finger of the collet.

* * * * *